UNITED STATES PATENT OFFICE.

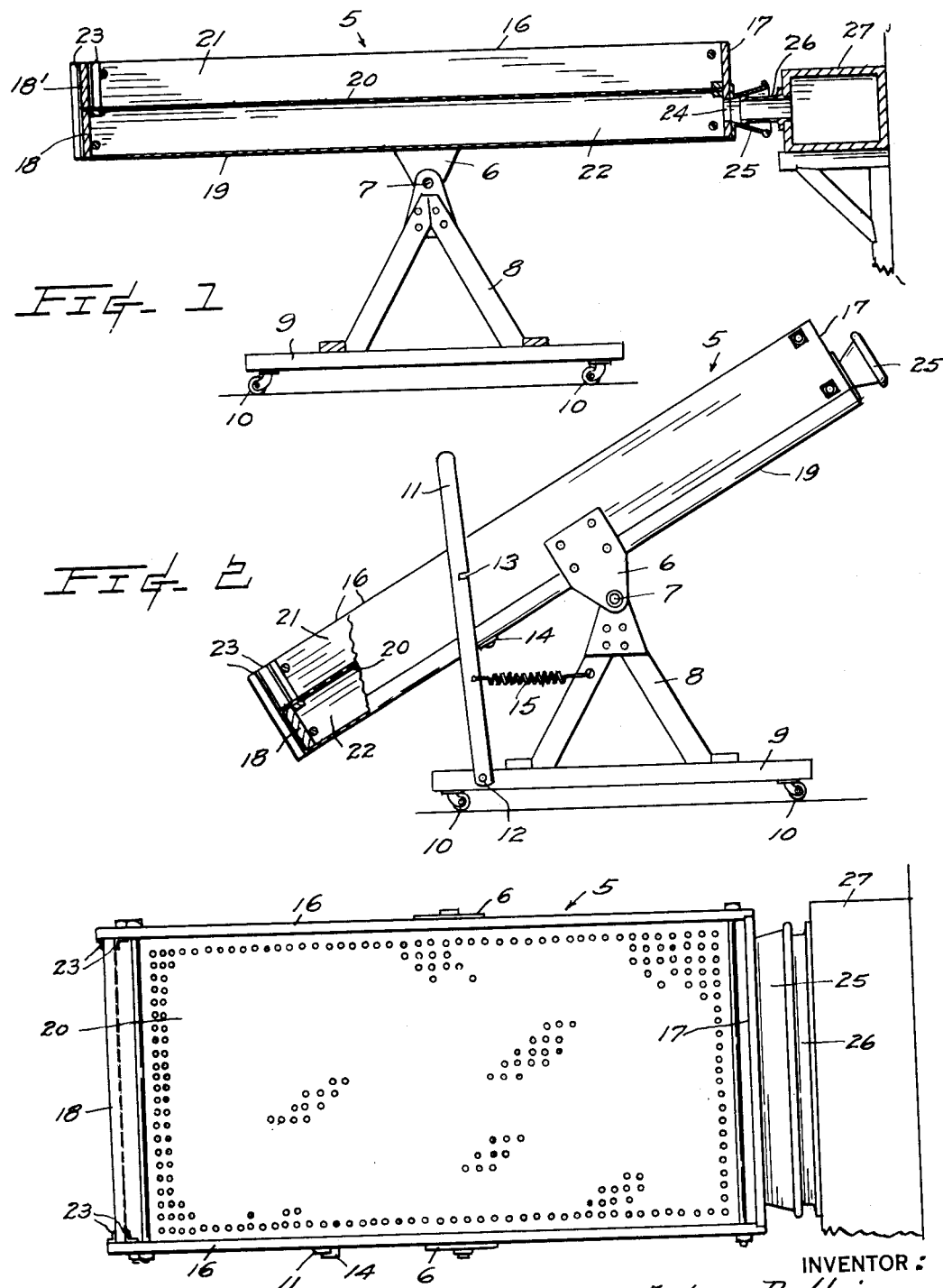

ANTON DELKIN, OF SEATTLE, WASHINGTON.

DRYING APPARATUS.

1,371,199.  Specification of Letters Patent.  Patented Mar. 8, 1921.

Application filed August 4, 1919. Serial No. 315,203.

*To all whom it may concern:*

Be it known that I, ANTON DELKIN, a citizen of the United States, residing at Seattle, in the county of King and State of Washington, have invented certain new and useful Improvements in Drying Apparatus, of which the following is a specification.

This invention relates to apparatus which is designed, more particularly, for drying and cooling peanuts.

An approved process of preparing peanuts for commercial purposes consists in first shelling and cleaning the same, then subjecting them to a roasting operation for the removal of the skins or hulls therefrom, after which the nuts are submerged within a basket in to a kettle of hot fat or oil for cooking and, finally, drying, wherein the nuts are exposed to a current of air for cooling to remove the oil therefrom to render them sufficiently dry for handling, packing, etc.

The principal object of the present invention is to provide means to carry out the above referred to drying step in a more expeditious and effective manner than hitherto.

A further object is to provide drying and cooling apparatus of simple, durable and strong construction, which may be readily cleaned, and by which large quantities of material can be conveniently and quickly handled.

The invention consists in the novel construction and adaptation of devices as will be hereinafter described and claimed.

In the accompanying drawings, Figure 1 is a longitudinal vertical sectional view of a drier embodying my invention, shown operatively connected to an air conduit.

Fig. 2 is a view in side elevation, shown partly broken away, of the drier, with the case member in tilted position and the discharge gate removed. Fig. 3 is a plan view of Fig. 1.

The reference numeral 5 designates a case having depending from its opposite sides and near its midlength plate elements 6 through which extends a transversely arranged rod 7. This rod is also connected to standards 8 provided on a carriage frame 9 which is mounted on wheels, preferably casters 10, to render the device portable.

Said rod constitutes a pivotal element whereby the case 5 may be disposed horizontally or in a tilted position, as in Fig. 2 for dumping the material therefrom as will be presently explained.

11 represents a prop or bar pivotally connected at 12 to the carriage frame and provided with a notch 13 to receive a catch 14 protruding from the case for releasably securing the same in a substantially horizontal position. The bar 11 is yieldingly held in position to be engagable with said catch by means of a spring 15 connected to the adjacent standard 8.

As shown in the drawings, the case is formed with side walls 16, end walls 17, 18, a bottom 19 and a removable floor 20 dividing the case into two chambers 21 and 22. The bottom 19 and floor 20 are of metal, the latter being, preferably, in the nature of a foraminated plate, although it may be a scren of woven wire.

The rear end wall 18 extends only to the floor 20 and thereabove I provide a section 18¹, which is removably held in place between spaced cleats 23 secured to the respective side walls. The front end wall 17 subjacent to the floor 20 is provided with an aperture 24 extending substantially the entire width of the chamber 22 and communicating with the opening provided in a flaring extension 25 of the case.

Engageable against the interior surfaces of the casing extension 25 is a spout 26 which protrudes from an air conduit 27 which leads to a fan or blower, not shown.

The material, such as peanuts, after being removed from the cooking vessel, is spread upon the case floor 20 and transported with the device to the cooling and drying station whereat the case is operatively connected to the conduit 27 by engaging the extension 25 with the spout 26, as represented in Fig. 1.

Air is withdrawn by the above mentioned fan or blower from the conduit to create a suction within the latter whereby air currents are drawn downwardly through the material and the perforations of the floor 20 to effect the cooling and drying of the material. During this operation, and due principally to the cooling action of the air blast, superfluous oil is liberated from the material and drops onto the bottom 19 of the case, from which it may be subsequently removed upon the withdrawal of the floor 20.

While the material is being dried the conduit spout 26 engaging within the flaring extension 25 of the case retains the latter in horizontal position and provides a coupling through which air is withdrawn from the case. When the device is to be removed from the conduit the bar 11 is utilized to prevent the case 5 from accidental tipping.

After the material has been suitably dried, the device is disengaged from the air conduit and transferred to the place where the material is to be deposited which is accomplished by removing the section 18¹, unlatching bar 11 and tilting the case, as represented in Fig. 2, to dump the material.

From the foregoing it will be perceived that the handling of the material with apparatus constructed in accordance with my invention, is facilitated by affording separable air connections between the conduit and the case for retaining the latter in operative material drying position.

What I claim, is:—

1. The combination with a stationary air conduit having a spout extending horizontally therefrom, of a carriage, a tipping drying-case provided on said carriage, and means extending from one end of the case and engageable with the conduit-spout for retaining the case in horizontal position when operatively connected to the conduit.

2. The combination with a stationary air conduit having a spout extending horizontally therefrom, of a carriage, a tipping drying-case provided on said carriage, means provided on the carriage and engageable with said case for releasably securing the latter from tilting when the case is being transported on said carriage, and means extending from one end of the case and engageable with the conduit-spout for retaining the case in horizontal position when operatively connected to the conduit.

3. The combination with a stationary air conduit and a spout extending therefrom, of a carriage, a tipping drying-case provided on said carriage, said case being provided with a horizontal foraminated partition dividing the case to provide a chamber below said partition, said chamber having at one of its ends an air outlet of substantially the width of said chamber, an extension at one end of the case having an opening therein which communicates with said outlet, said extension opening being adapted to receive the conduit spout whereby said chamber is operatively connected to said conduit and said spout serving to prevent the adjacent end of the case being tipped up or down when the extension is coupled with said spout.

Signed at Seattle, Washington, this 25th day of July, 1919.

ANTON DELKIN.

Witnesses:
P. G. MARION.
Geo. DARLING.